Jan. 14, 1958   A. FREUNDORFER   2,819,812
SHIPPING AND DRINKING VESSEL FOR CARBONIC GAS BEVERAGES
Filed Aug. 30, 1954   2 Sheets-Sheet 1
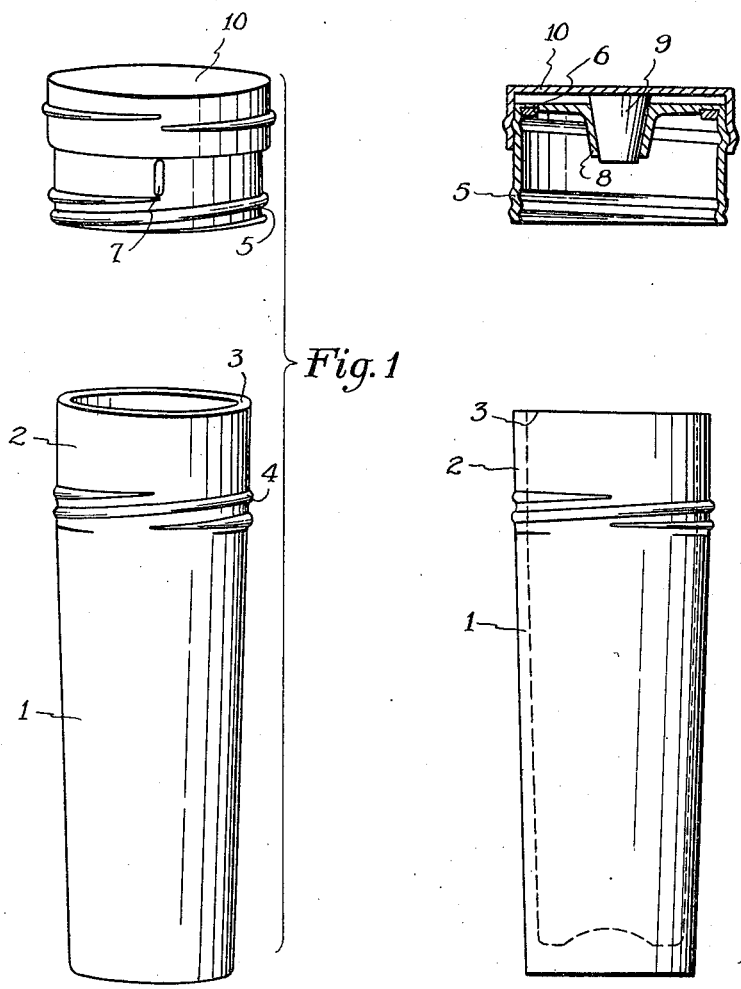
INVENTOR
*Albert Freundorfer*
BY *Bailey, Stephens & Huettig*
ATTORNEYS Jan. 14, 1958 A. FREUNDORFER 2,819,812
SHIPPING AND DRINKING VESSEL FOR CARBONIC GAS BEVERAGES
Filed Aug. 30, 1954 2 Sheets-Sheet 2

INVENTOR
Albert Freundorfer

BY
Bailey, Stephens & Huettig
ATTORNEYS

United States Patent Office 2,819,812
Patented Jan. 14, 1958

2,819,812

SHIPPING AND DRINKING VESSEL FOR CARBONIC GAS BEVERAGES

Albert Freundorfer, Arnstorf, Germany, assignor of one-half to Louise Widmann, Washington, D. C.

Application August 30, 1954, Serial No. 452,993

1 Claim. (Cl. 220—29)

The invention relates to a new and useful shipping and drinking container, preferably of glass with a detachable cover for carbonic beverages, especially for beer.

Heretofore such sealable and transportable containers for carbonic gas beverages were in the form of a bottle which had the mouth of its neck portion sealed with a device such as a crown cap. Such bottles have considerable disadvantages as to their shipping and drinking properties; for example, the shipping space cannot be efficiently used because of the constricted neck portion, and, furthermore, most people do not like to use such a bottle as a drinking vessel. Thus, another glass customarily is used for receiving the content of such a bottle. Another disadvantage resides in that such bottles cannot easily be washed and cleaned because of the neck portion.

This invention avoids all of these disadvantages in that the upper end of a conical container is cylindrically shaped, and an overlapping cover with a seal is provided for covering the container. The cover is fixed thereto preferably by a screw joint, or a flange or the like, by means of which the cover is detachably joined with the correspondingly shaped outer face of the wall of the container, said shaped portion being suitably spaced from the upper end of the container.

By means of known bottle filling apparatus, the carbonic beverage, for example, beer, can be filled into such cup-shaped containers as into regular bottles. Because of the form of the cup, the shipping space of these containers is much better used than that of ordinary bottles. Another advantage resides in that the container can be used as a drinking glass after the cover has been removed. Thus the container is usable in restaurants and other places with quick service, as no additional cups need to be served. Therefore, no customer will be obliged to either drink from bottles or to pour the content of the bottle into an additional glass.

As mentioned above, the shaped portion of the outer face of the wall of the container should be spaced from about 2 to 3 cm. from the upper edge or rim in order not to interfere with the drinker. The cover is made of a corrosion-resistant material which does not harm the quality of the beverage. The seal for the cover is of such a material and arranged in such a way as to prevent the carbon dioxide gas from escaping. When the container is filled, the level of the liquid should still be spaced about 2 to 3 cm. from the upper edge in order to prevent the beer from foaming over the edge when the cover is removed. Moreover, the beer, when filled into the container, should not exceed a maximum temperature of about minus 2° C. in order to completely prevent the beer from foaming. Naturally the beer is served at higher temperatures so that then the beer will foam, thus forming the normal so-called beer flower.

The so-called semi-freeze process for bottling the beer has not yet prevailed in breweries because it necessitates many changes in machines. In order to make the instant container adaptable for being used in a bottling process without said semi-freeze process, the cover of the cup is provided with a preferably centrally arranged filler tube extending into the cup, into which a sealing body can be screwed. This threaded plug is placed in the filler tube immediately after the container is filled and before the beer foams. Both cover and plug sufficiently seal the cup.

In another embodiment of the container for use in bottling process without deep-freezing, the cover again is provided with a preferably centrally arranged and inwardly extending filler tube for receiving a conically shaped sealing plug, and its upper portion is so shaped that a second cover can be screwed on or fixed by means of a flange to the first cover, said second overlapping cover pressing against the sealing plug which slightly extends above the upper face of the interior cover, and which thus is prevented from being pushed out by the pressure of the carbon dioxide gas. The particular advantages of such a double-cover container reside in that a smooth plug, for instance, a cork or rubber body, can be pushed into the filler tube more quickly than a threaded plug can be screwed into it. Thus, even if the beer has its greatest foaming potential, it will not have sufficient time to foam out of the container. Furthermore, the container is especially fit for transportation since due to the second cover it has a smooth top. Moreover, the double-cover container with the smooth plug is cheaper to produce than a container provided with a cover with a threaded plug. When the container is opened, both covers can be removed as one together. Therefore, to drink from a double-cover container does not take more time than from that having but one cover. Finally, the smooth and free outer face of the outer cover can well be used for advertising purposes.

Still another advantage of the present invention resides in that a circular seal is inserted within the first or single cover, preferably in such a way that it is tightly held by the cover, so that its sealing surface covers exactly the edge of the cup. Such a ring, for example, of cork or rubber, seals the container very tightly, and it is removed together with the cover instead of remaining on the edge.

In order to facilitate the removal of the one or of both covers, it may be advantageous to give the outer face of the cover a rough surface, for example, by providing it with a plurality of longitudinal ribs.

The effectiveness of transportation can be increased greatly when the front surface of the single or outer cover is provided with a recessed portion so that a similar cup can be nested therewith. Thus a large number of containers can be transported without much danger.

In order to prevent the influence of active light on the beverage within the container during transportation and storage, it is advantageous if the container is made of a glass with a protective color, preferably golden-yellow, which has proved to be very effective. For the same purpose the container may be wrapped in an opaque paper, for instance, tinfoil, which also may be used for advertising purposes.

According to the invention, the manufacture of special bottling machines for filling the containers can be avoided, if the bottle centering bell of any regular, fully automatic bottling machine is provided with a rubber coating or lining having a preferably central opening for the passage of the beverage to be bottled.

The container is put underneath the centering bell where the edge of the cover is pressed against the rubber coating and forms a tight seal therewith. If the inner diameter of the open side of the centering bell is smaller than the overall diameter of the cover of the container, the rubber coating must be given such a size that it extends so far beyond the edge of the bell that its diameter equals the overall diameter of the cover. In order to keep the rubber coating in place, the inner wall of the centering bell can be provided with a circular groove to which the rubber coating is secured by means of a continuous bead, and wherefrom it can also be removed. Thus, the same machine can be used for bottling both bottles and drinking place containers.

The accompanying drawings illustrate schematically both a shipping or drinking container according to the invention, and a suitable bottling means by way of example for the filling of the container.

Figure 1 is an exploded side elevational view of the beer glass with its cover removed therefrom;

Figure 2 is a similar view with the beer glass cover shown in cross-section;

Figure 3:
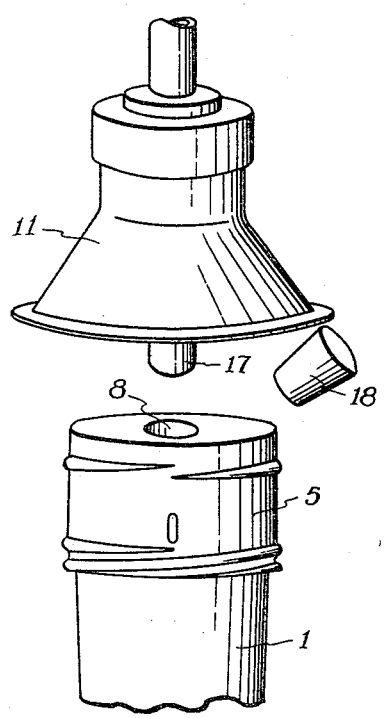
Figures 3 and 4 are a side elevational and cross-sectional view, respectively, of the beer glass provided with a cover for the bottling process, and the bottling centering bell provided with a rubber coating or lining.
Figure 4:
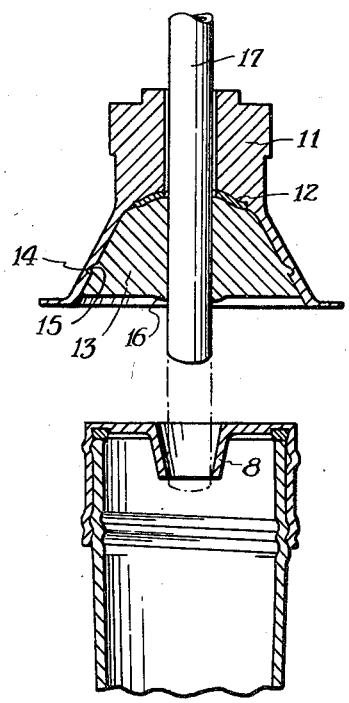

The upper portion 2 below the rim 3 of the cup 1, for example, a beer glass, is cylindrically formed and is provided with a screw thread 4, the threads of which are rounded in order to prevent any jamming of the cover when it is unscrewed. Cover 5 is screwed on the screw thread 4, said cover being provided with a matching screw thread, and also being provided with a continuous sealing ring 6 which is tightly secured to the inner face of the cover along its periphery, and the sealing face of which fits the rim 3 of the glass, thus forming a tight seal. Moreover, the outer face of the cover 5 is provided with a plurality of longitudinal ribs 7. The cover 5 is also provided with a central filling opening 8 with an inwardly extending conically converging filler tube, into which a correspondingly conically shaped plug 9 is placed. An outer cover 10 is screwed on the cover 5 pressing against the plug 9. During the bottling process only the cover 5 is screwed on the cup 1. The cup can be filled, for example, by pressing the filling opening 8 by means of a spring device against a filling tube which is provided with a conical rubber nozzle, thus forming a tight seal while the cup is filled. Modern fully automatic bottling machines have a bottle centering bell 11, as for example, shown in Figures 3-5. Such a centering bell is provided with a sealing ring 12 which is arranged on the edge of the filling opening of the bell. The bottles are pressed against that sealing ring. According to the present invention, such a bottle centering bell for the bottling of cups according to the invention, is provided with a rubber coating or lining 13 with a central passage for the beverage to be bottled, against the lower, free, open side of which the cup 1 with its cover 5 is pressed, thus forming a tight seal. The inner wall of the bell 11 is provided with a continuous groove 14 to which the rubber body 13 is detachably secured by means of a correspondingly shaped bead 15 on the rubber body. In order to obtain a better seal between the rubber body 13 and the opening 8 of the cover 5, the edge or rim 16 at the lower end of the passage in the rubber body is downwardly enlarged. After the container is placed under such a bell provided with a rubber coating, the container can be filled up by means of a feeding tube 17. Immediately afterwards the plug 18 is placed in the opening 8 in order to prevent the bottled beverage from foaming, then the second cover 10 is screwed on the cover 5.

Figure 5:
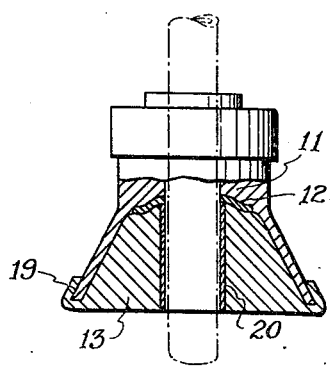
Figure 5 is a side view partly in cross-section of the rubber coating in the centering bell.

As shown in Figure 5, the rubber coating 13 can be attached to the bell 11 by means of overlapping portions 19. Thus, it is not necessary to provide the bell with a groove. In order to secure the inner diameter of the passage of the rubber body 13, a tube 20 of brass can be inserted therein for the passage of the feeding tube 17.

Having now described the means by which the objects of this invention are obtained,

I claim:

A shipping and drinking container for carbonic gas beverages comprising a drinking cup having a lower conical portion and an upper cylindrical portion having the maximum diameter of said conical portion and terminating in a rim, an inner cover seated on said rim with sealing means therebetween, a threaded joint connecting said inner cover to said cylindrical portion, a beverage filling tube extending centrally through said inner cover, plug means for closing said tube, and an outer cover detachably secured to said inner cover and bearing on said plug means for resisting gas pressure in said container.

References Cited in the file of this patent

UNITED STATES PATENTS

| | | |
|---|---|---|
| 1,228,285 | Bieker | May 29, 1917 |
| 1,587,167 | Marsden | June 1, 1926 |
| 1,629,639 | Rollins | May 24, 1927 |
| 1,955,009 | McMillan | Apr. 17, 1934 |
| 2,268,734 | Beck | Jan. 6, 1942 |
| 2,414,138 | Bruckner | Jan. 14, 1947 |
| 2,448,893 | Lamar | Sept. 7, 1948 |
| 2,640,626 | Newell | June 2, 1953 |
| 2,659,510 | Jung | Nov. 17, 1953 |
| 2,689,665 | Martin | Sept. 21, 1954 |

FOREIGN PATENTS

| | | |
|---|---|---|
| 251,745 | Great Britain | May 13, 1926 |
| 426,726 | Great Britain | Apr. 9, 1935 |
| 558,998 | Great Britain | Jan. 31, 1944 |